United States Patent
Cleodolphi et al.

(10) Patent No.: US 11,383,752 B2
(45) Date of Patent: Jul. 12, 2022

(54) SUPPORT FOR STEERING WHEEL OF A VEHICLE AND A VEHICLE INCLUDING A SUPPORT

(71) Applicant: CNH Industrial America LLC, New Holland, PA (US)

(72) Inventors: Daenio Cleodolphi, Piracicaba (BR); João Augusto Marcolin Lucca, São Pedro (BR); Leonardo Dos Santos Carvalho, Piracicaba (BR); Marco Aurélio Ramos Pereira, Piracicaba (BR)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/265,111

(22) PCT Filed: Jul. 1, 2019

(86) PCT No.: PCT/BR2019/050242
§ 371 (c)(1),
(2) Date: Feb. 1, 2021

(87) PCT Pub. No.: WO2020/024026
PCT Pub. Date: Feb. 6, 2020

(65) Prior Publication Data
US 2021/0316778 A1    Oct. 14, 2021

(30) Foreign Application Priority Data

Jul. 31, 2018   (BR) .......................... 10 2018 015638

(51) Int. Cl.
*B62D 1/04*    (2006.01)
*B62D 1/16*    (2006.01)
(Continued)

(52) U.S. Cl.
CPC ............... *B62D 1/10* (2013.01); *B62D 1/183* (2013.01); *B62D 1/184* (2013.01); *E02F 9/2004* (2013.01)

(58) Field of Classification Search
CPC . B62D 1/10; B62D 1/16; B62D 1/166; B62D 1/18; B62D 1/181; B62D 1/183;
(Continued)

(56) References Cited

U.S. PATENT DOCUMENTS 3,216,521 A * 11/1965 Glenna .................. B62D 1/181
                                                             180/78
3,347,558 A * 10/1967 Grimes .............. B62D 49/0685
                                                             280/775

(Continued)

FOREIGN PATENT DOCUMENTS

CN    113276935 A  *  8/2021
DE    3507189 A1       9/1986
(Continued)

OTHER PUBLICATIONS

PCT International Search Report for PCT application PCT/BR2019/050242, dated Sep. 8, 2019 (3 pages).
(Continued)

*Primary Examiner* — Adam D Rogers
(74) *Attorney, Agent, or Firm* — Peter Zacharias; Patrick Sheldrake

(57) ABSTRACT

A support for a steering wheel of an agricultural or construction vehicle to improve working conditions of operators inside cabins and, also, to simplify production lines of the vehicle. A steering wheel support is formed by first and second articulated elements which are connected together and fastened on an installation base, and the first articulated element is pivoted on the installation base, while the second articulated element is connected at an opposite end of the
(Continued)

first articulated element through a connector element, and a free end of the second articulated element further sustains a framework for installing a steering box with its respective steering wheel.

12 Claims, 4 Drawing Sheets

(51) Int. Cl.
  *B62D 1/10* (2006.01)
  *B62D 1/183* (2006.01)
  *B62D 1/184* (2006.01)
  *E02F 9/20* (2006.01)

(58) Field of Classification Search
  CPC ......... B62D 1/184; B62D 1/189; B62D 1/24; E02F 9/2004
  See application file for complete search history.

(56) References Cited

U.S. PATENT DOCUMENTS

| | | | |
|---|---|---|---|
| 3,362,247 A * | 1/1968 | Watts | B62D 1/18 74/493 |
| 4,909,343 A * | 3/1990 | Mouri | B62D 5/0466 180/422 |
| 5,016,722 A | 5/1991 | Morita et al. | |
| 6,857,498 B2 | 2/2005 | Vitale et al. | |
| 6,948,740 B2 * | 9/2005 | Chernoff | B60T 7/08 280/775 |
| 7,302,899 B2 * | 12/2007 | Zeiger | B63H 25/02 114/144 R |
| 9,315,207 B2 | 4/2016 | Huang et al. | |
| 10,486,730 B2 * | 11/2019 | Hansen | B62D 1/183 |
| 2009/0321171 A1 | 12/2009 | Hakansson | |
| 2016/0304113 A1 * | 10/2016 | McCurdy | B62D 1/183 |
| 2019/0367072 A1 * | 12/2019 | Hansen | B62D 1/183 |
| 2021/0078625 A1 * | 3/2021 | Yamazaki | B62D 1/183 |
| 2021/0380158 A1 * | 12/2021 | Kurokawa | B62D 5/0481 |

FOREIGN PATENT DOCUMENTS

| | | | |
|---|---|---|---|
| DE | 19624003 A1 | 12/1997 | |
| DE | 10212623 A1 * | 10/2003 | ............ B62D 7/08 |
| DE | 10212623 A1 | 10/2003 | |
| DE | 102018203930 A1 * | 9/2019 | ............ B62D 5/001 |
| EP | 481432 A1 | 10/1991 | |
| EP | 2342116 B1 | 9/2015 | |
| FR | 1490973 A | 8/1967 | |
| JP | 2004231054 A * | 8/2004 | |
| WO | 2010020849 A1 | 2/2010 | |
| WO | WO-2010050882 A1 * | 5/2010 | ............ B62D 1/183 |
| WO | WO-2014098655 A1 * | 6/2014 | ........... B62D 5/0463 |
| WO | WO-2021185460 A1 * | 9/2021 | |

OTHER PUBLICATIONS

PCT Written Opinion for PCT application PCT/BR2019/050242, dated Sep. 8, 2019 (3 pages).

* cited by examiner

SUPPORT FOR STEERING WHEEL OF A VEHICLE AND A VEHICLE INCLUDING A SUPPORT

FIELD OF THE INVENTION

The present invention refers, in a general manner, to a support for the steering wheel of a vehicle, particularly vehicles intended for farming and/or civil engineering, which was designed and developed to eliminate the front steering column and, thereby, improve the visibility and convenience of the operators.

The invention also refers to a vehicle for use off-road and/or in civil engineering, such as a tractor, a harvester, a picker, which comprises said steering wheel support.

BACKGROUND OF THE INVENTION

Numerous machinery models, equipment and vehicles intended for use in farming and in civil engineering are known in the state of the art, which are, in the present specification, simply referred to as vehicles in a general manner, and are usually made up of a relatively large, robust and heavy structure with at least one control and operation cabin within which various components, devices and mechanisms are arranged, allowing operators to be able to drive and control the vehicle so that it performs its tasks efficiently and safely in the fields.

Among these various components, devices and mechanisms installed inside the cabins of vehicles, there is a steering wheel, or in some cases, a joystick control, the purpose of which is to drive and direct the vehicle. Thus, as is common knowledge in the art, in cases where the steering wheel is used, the cabins of these vehicles are endowed with a steering column installed in the region in front of the seat where the operator is accommodated and, consequently, ends up restricting the operator's visibility, as well as restricting the accommodation and comfort of the operator, especially upon entering and exiting the cabin.

Additionally, it is known that, in a way, there is a wide variety of models of cabins that are designed and assembled precisely to suit the control and driving mode of the vehicle, which can be with steering wheel or "joystick". Therefore, manufacturers and assemblers of these vehicles end up being forced to maintain production lines of different models of cabins to meet this need which certainly affects the final production costs of vehicles.

Particularly with regard to ergonomics, comfort and convenience of operators, it can be observed that the models of vehicles endowed with steering wheel known in the state of the art reveal drawbacks mainly in the moments of sitting down on and raising up from the seat, since operators need to make often uncomfortable movements to get their legs through the gaps formed between the edge of the steering wheel and the seat itself.

Thus, it was found that the cabins of vehicles known in the state of the art comprise inadequately installed steering wheels and that could be modified and improved, especially with regard to supporting structure and support of steering wheels to thus obtain a cost reduction to simplify the manufacture of these control and operation cabins, increase the level of safety during operation due to increased and improved operator visibility during work, and also offer better working conditions to operators, especially with regard to ergonomics, comfort and convenience while moving inside the cab. Therefore, these are, in a way, the results that are intended to be achieved with the development of the present invention.

DESCRIPTION OF THE INVENTION

Given the scenario presented above, it is one of the objectives of the present invention to provide a support for the steering wheel of a vehicle, particularly for use in farming or civil engineering, which was developed and designed to obtain a practical and functional solution to the problems, limitations and drawbacks generated in the state of the art, as exemplified above.

More particularly, the objective of the present invention is to provide a support for the steering wheel of a vehicle, such as tractors, harvesters, pickers, diggers, motor graders, among others, which comprises innovative technical and constructive characteristics to improve the working conditions of the operators inside the cabins and, also, to simplify the production lines of these vehicles, especially in the construction and assembly stage of the control and operation cabins.

Thus, in order to achieve the above-mentioned objectives and technical and functional effects, as well as others, the present invention refers to a new steering wheel support that comprises two articulated elements which are connected together and fastened on an installation base, and the first articulated element is pivoted on said installation base, while the second articulated element is connected at the opposite end of first said articulated element, and the free end of said second articulated element further sustains a framework for installing a steering box with its respective steering wheel.

According to an embodiment of the present invention, said connector element is a glove, a pivot or an articulating device for rotational movement of the second articulated element in relation to said first articulated element. Further, this connector element may comprise embedded locks for blocking the second articulated element in relation to the first articulated element.

Further, according to another embodiment of the present invention, the aforementioned first articulated element is pivoted on the installation base through a pivoting element.

According to another embodiment of the present invention, said framework may comprise means for adjusting the slant of the steering block jointly with the respective steering wheel, such that said slant of the steering wheel respects an angle (a) which varies between −10° and +10°.

Further, according to one embodiment of the present invention, the first articulated element comprises a locking mechanism next to the installation base, and said locking mechanism is formed by a branch endowed with locking pin which are disposed on the lower portion of said first articulated element for respective encasement into a receiver member positioned on said installation base.

According to another embodiment of the present invention, said installation base may comprise a height adjustment mechanism.

The steering box, according to one embodiment of the present invention, comprises hydraulic and/or electrical systems, which are conducted through said first and second articulated elements, which are tubular and may comprise differently configured sectional profiles.

Further, according to another embodiment of the present invention, said articulation base may be anchored to the structure of the seat of the vehicle.

And, lastly, the present invention also refers to a vehicle for use off-road and/or in civil engineering, formed by a chassis mounted on wheels with tires, or on sets of belts, a cabin for operation and control and whose front or rear portion houses an engine under the hood to provide traction for movement of this vehicle, which comprises a steering wheel support as previously presented. Said vehicle may be a tractor, a harvester, a picker, an excavator, a motor grader, a backhoe, or any farming and/or civil engineering machinery in general.

SUMMARIZED DESCRIPTION OF THE DRAWINGS

The characteristics, advantages and technical effects of the present invention, as highlighted above, will be understood in a better and more adequate way by a person skilled in the art based on the detailed description ahead, provided solely on an exemplary and non-restrictive basis, of possible embodiments, and with reference to the accompanying schematic drawings, wherein.

DESCRIPTION OF EMBODIMENTS OF THE INVENTION

The invention will now be described in relation to its particular embodiments, making reference to the accompanying figures. Said figures are schematic, and their dimensions and/or proportions may not correspond to reality, since they are intended to describe invention in a didactic way. In addition, certain known and common constructive details may have been omitted for greater clarity and conciseness of the description that is made below. The reference numbers used are repeated throughout the figures to identify identical or similar parts. The terms eventually used as "above", "below", "front", "back", "right", "left" etc. and their variants should be interpreted according to the orientation given in FIG. 1.

As previously mentioned, the terms used herein such as vehicle, machine, equipment intended for farming and/or in civil engineering must be interpreted indistinctly to indicate any work vehicle, for example: tractors, harvesters, pickers, diggers, motor graders, backhoes, etc.

Figure 1:
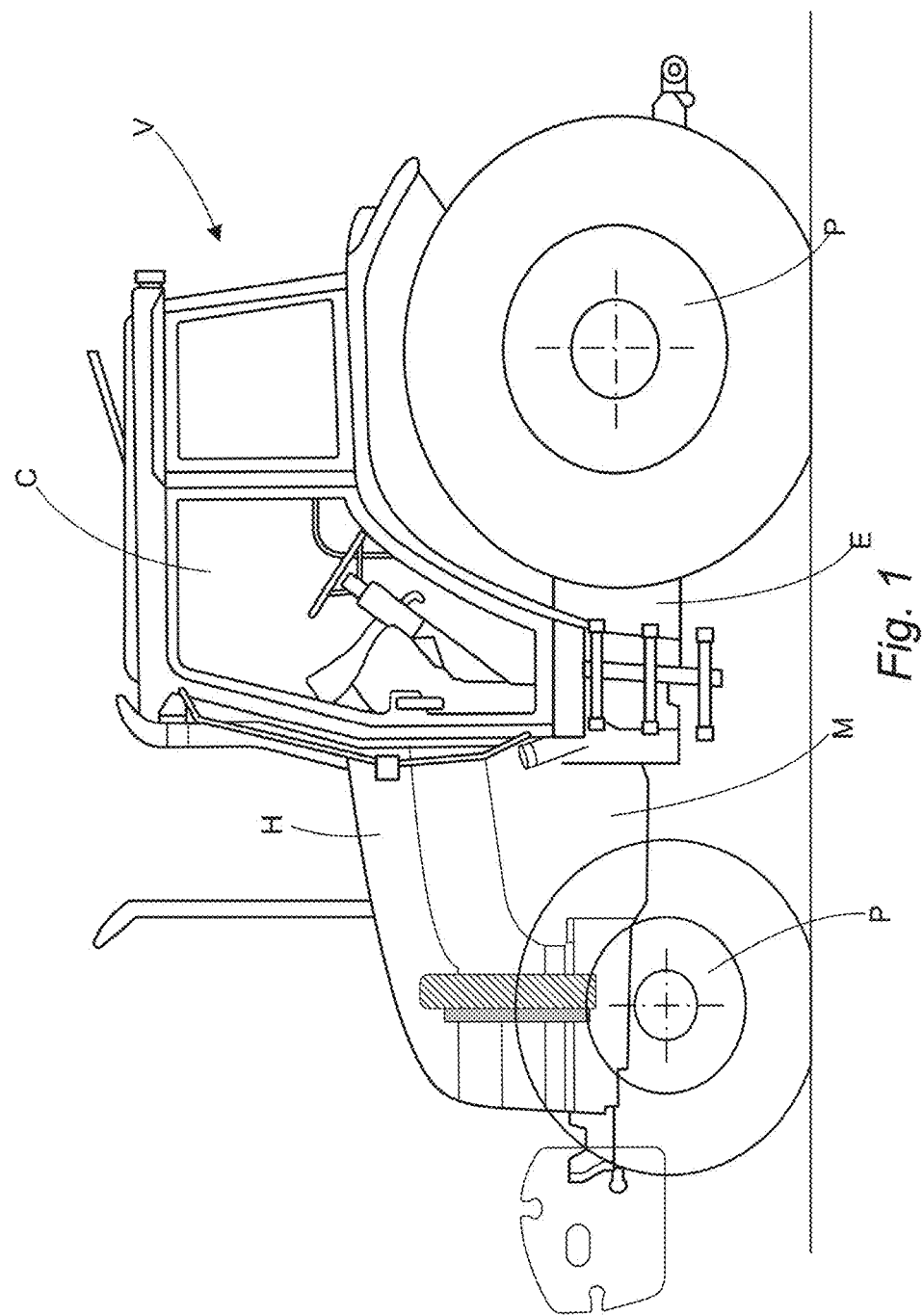
FIG. 1 shows a schematic side view of a vehicle model, such as a tractor for farming activity and/or civil construction.

Particularly with regard to drawings being merely illustrative and for the purpose of contextualization for improved understanding of the subject matter according to the present invention, FIG. 1 shows a schematic representation of a vehicle (V) that can be used in farming or in civil engineering, such as a tractor. This vehicle (V) may be, for example, a machine or equipment known in the state of the art, and such as those manufactured and marketed by CNH Industrial N.V.

Basically, it is possible to observe that the vehicle (V) comprises a chassis (E) mounted on wheels with tires (P), or eventually on sets of belts, a cabin for operation and control (C) and whose front portion accommodates the engine (M) under the hood (H) to provide traction for said wheels with tires (P). More particularly with regard to the control and operation cabin (C) of the vehicle (V), a series of devices, mechanisms and components are installed for the convenience of the operator and, also, for the effective controlled driving of the vehicle (V), for example, seat, steering wheel or "joystick", control panel, air conditioning, monitors, etc.

In this context, according to the present invention and as represented in the other figures, the steering wheel support 1 is formed by two articulated elements 2, 3 connected to each other and fastened on an installation base 4 that is anchored on the structure of the seat 5, and the first articulated element 2 is pivoted, on the one side, on the said installation base 4, and on the other side embedded at one end of the second articulated element 3 through a connector element 6. The free end of said second articulated element 3 is responsible for sustaining a framework 7 for the installation of a steering box 8 with the respective steering wheel 9.

Figure 2A:
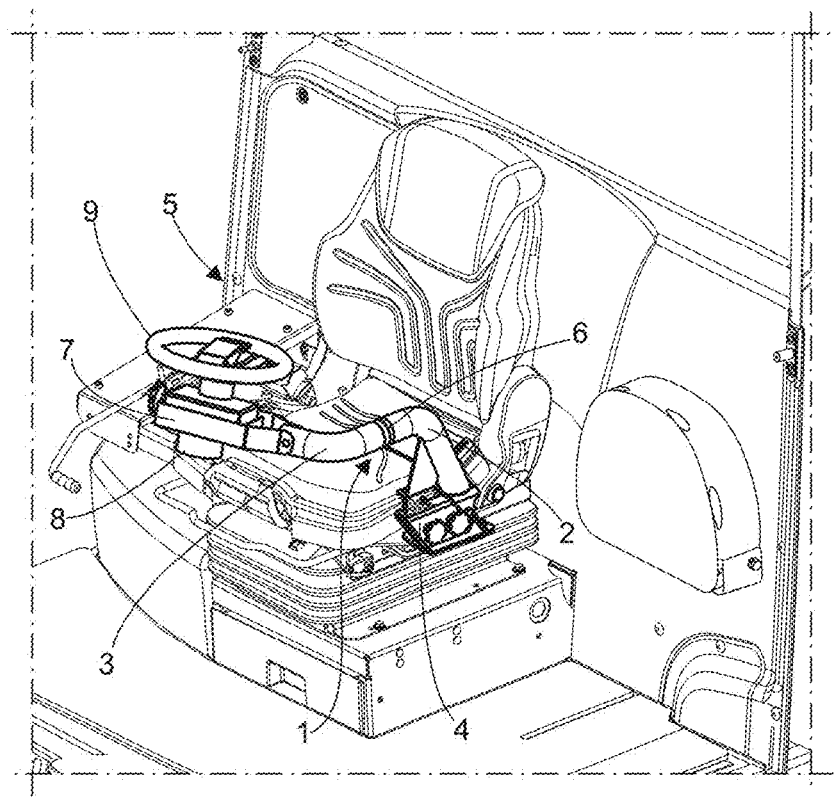
FIGS. 2A and 2B show perspective views of the seat of a control and operation cabin with steering wheel support, according to the present invention, respectively, in the normal positions of use and retracted.
Figure 2B:
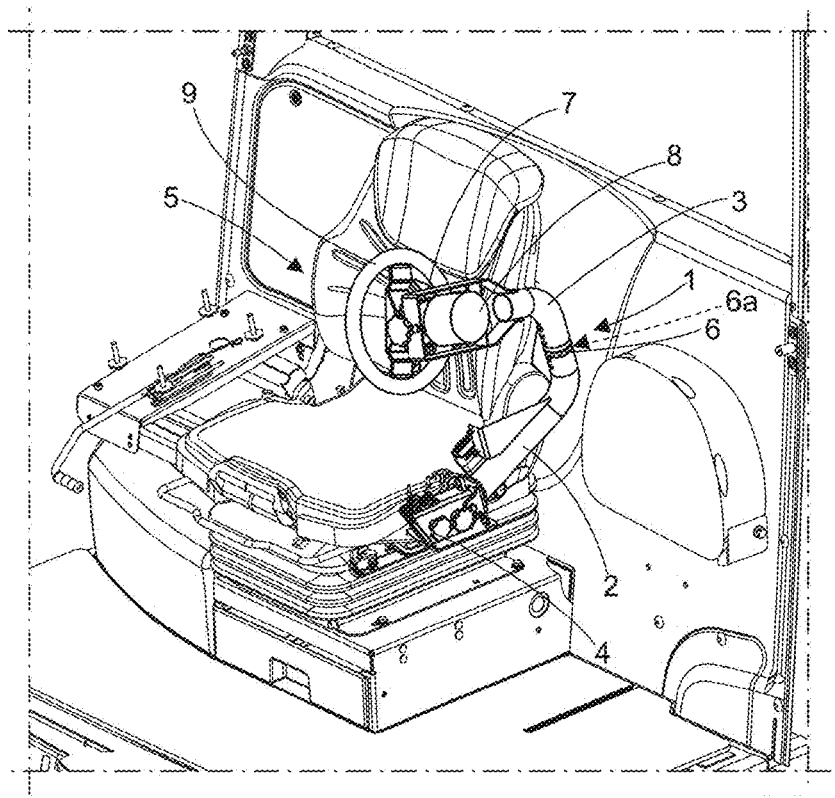

As represented by FIGS. 2A and 2B, it is possible to note that steering wheel support 1, object of the present invention, allows the elimination of the traditional steering columns that are arranged in front of seat 5 and, as a result, improves operator mobility and comfort, in addition to significantly improving visibility during work, especially in cases of crop harvesting where the operator needs to be attentive precisely at the front of the machine while moving across the field.

According to an embodiment of the present invention, said connector element 6, responsible for making the connection between said first and second articulated elements 2, 3, can be a glove, a pivot, an appropriate articulating device that allows the rotational movement of the second articulated element 3 in relation to the first articulated element 2, such as on the imaginary X axis. Additionally, in order to obtain a safe movement, said connector element 6 may comprise embedded locks 6a for maintaining the steering wheel in the desired position, blocking said second articulated element 3 in relation to the first articulated element 2, either in the position for use, as in the retracted position.

Further, according to one embodiment of the steering wheel support 1, object of the present invention, said first articulated element 2 is pivoted on said installation base 4 through a pivoting element 4a whose purpose is to provide the rotational displacement of the first element 2 on the imaginary Z axis.

Additionally, the framework 7 of the steering wheel support 1 of the present invention comprises a third imaginary W axis, on which the steering block 8 jointly with the steering wheel 9 can move angularly, thereby allowing an adjustment to the slant of the steering wheel 9 according to an angle ($\alpha$) for improved operator adaptation. According to particular embodiments, this angle ($\alpha$) can vary between −10° and +10° increasing and improving the convenience and ergonomics of operators during performance of the work.

Figure 3A:
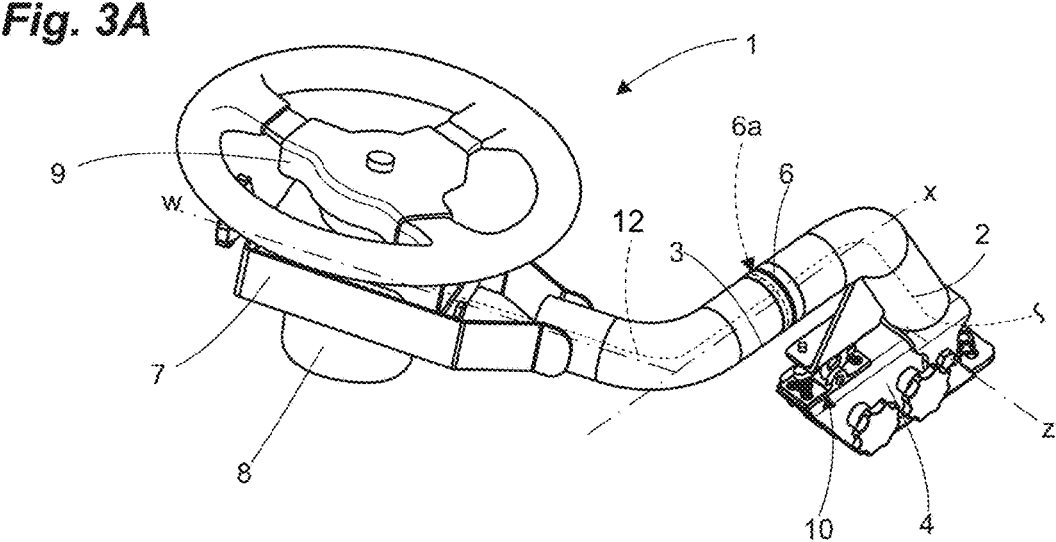
FIGS. 3A, 3B and 3C show a schematic perspective view of an example sequence of steering wheel support movement, according to the present invention.
Figure 3B:
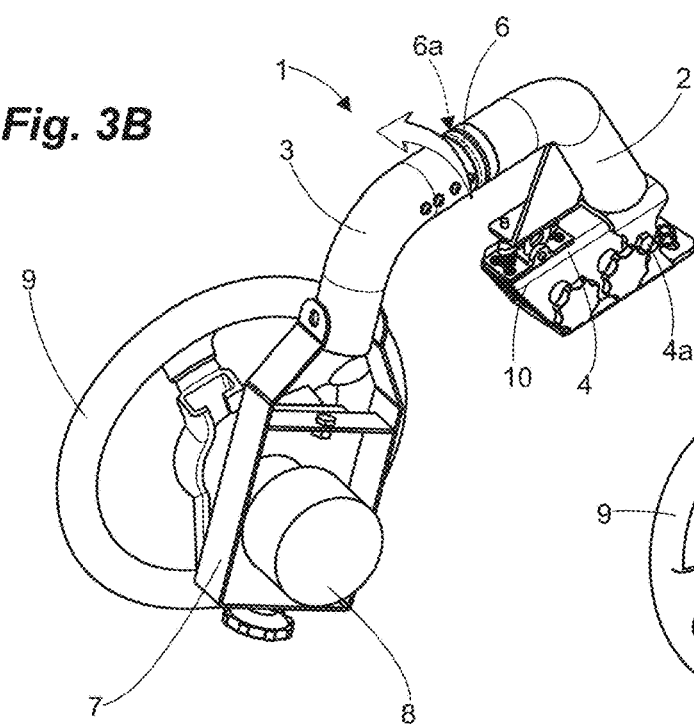
Figure 3C:
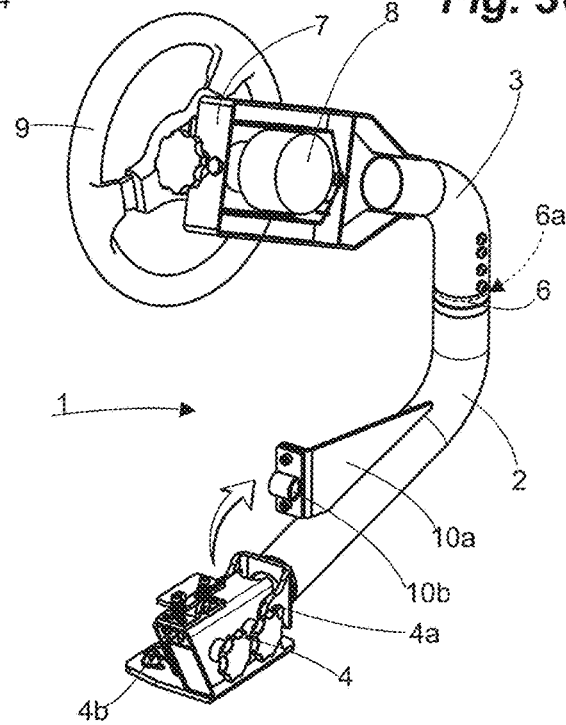

For example, FIGS. 3A, 3B and 3C schematically illustrate a movement sequence of the steering wheel support 1 according to the present invention. More specifically, it can be noted that FIG. 3A shows the steering wheel support 1 in its usage position, or in the condition in which the operator is working and the steering wheel 9 is being utilized. FIG. 3B demonstrates the first movement of the steering wheel support 1, where the second articulated element 3 was rotated 90° degrees e.g. clockwise in relation to the X axis. Lastly, FIG. 3C shows the first articulated element 2 rotated 90°, for example clockwise in relation to the Z axis, at which point it positions the steering wheel support 1 in retracted state, fully releasing operator access to the seat 5, either to sit as to arise.

According to one embodiment of the present invention, said first articulated element 2 comprises a locking 10 mechanism that interacts with said installation base 4 so as to avoid involuntary movement and ensure proper operation of steering wheel support 1. More particularly, this locking mechanism 10 is formed by a branch 10a endowed with locking pin 10b which are disposed on the lower portion of said first articulated element 2. Said installation base 4 is endowed with receiver member 4b that accommodates said locking pin 10b when the second articulated element is in the lowered position.

Figure 4:
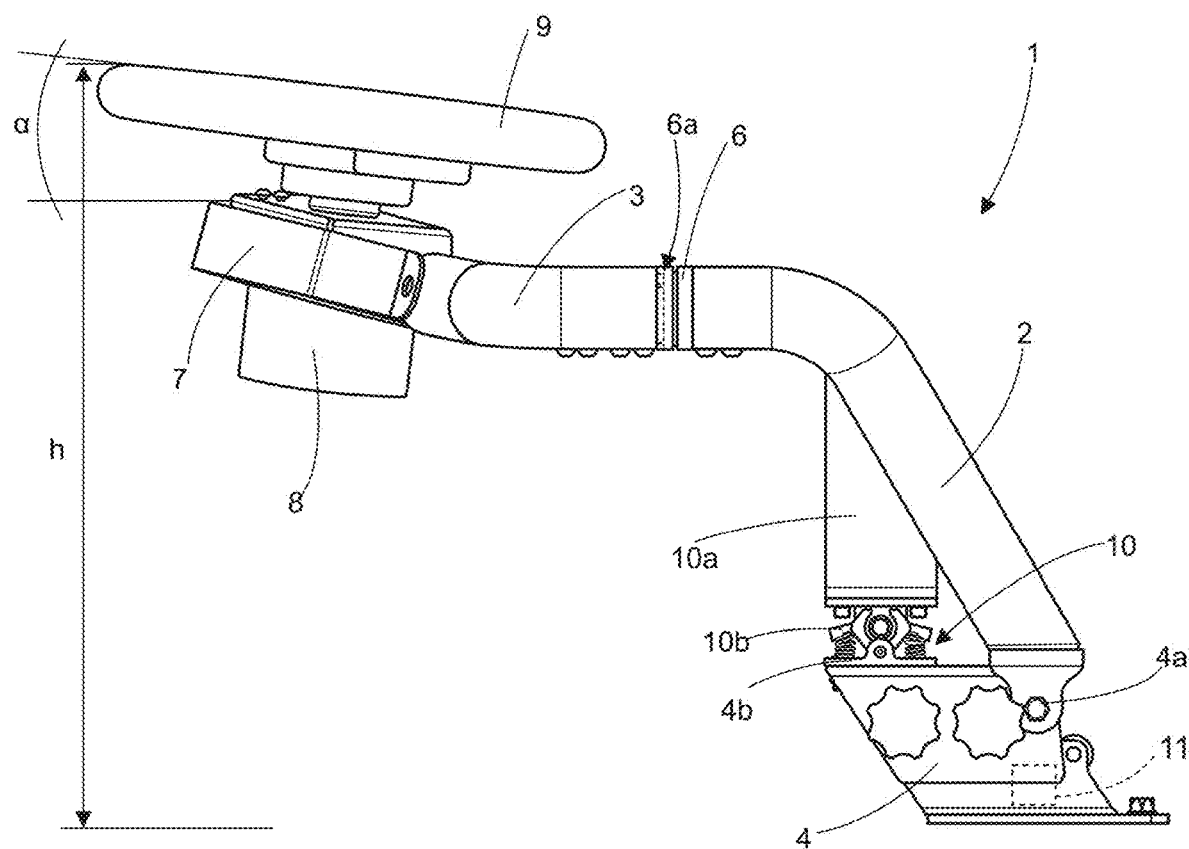
FIG. 4 shows a schematic side view of steering wheel support according to the present invention.

Furthermore, according to another embodiment of the present invention, and as shown in FIG. 4, the steering wheel support 1 may have its height (h) adjusted to further increase the comfort and ergonomics of operators. More particularly, the adjustment of the said height (h) is obtained through an adjustment mechanism 11 provided in said installation base 4.

Said steering box 8 can be of different models and comprise different technologies known in the state of the art to assist the steering control. As an exemplary and not limiting basis, the steering box 8 may include hydraulic and/or electrical systems 12, which are likely to be conducted through said first and second articulated elements 2, 3 which, according to one embodiment, can be tubular with differently configured sectional profiles.

Additionally, and as previously indicated, the present invention refers to a vehicle (V), particularly for applications in farming and/or in civil engineering, which is formed by a chassis (E) mounted on wheels with tires (P), or eventually on sets of belts, a cabin (C) for operation and control and whose front or rear portion houses the engine (M) under the hood (H) to provide traction for the movement of said vehicle, and said cabin (C) has at least one seat 5 on which the installation base 4 of said steering wheel support 1 is anchored.

According to possible embodiments of the present invention, this vehicle (V) may be any type of farming or civil engineering machinery, such as tractors, harvesters, pickers, diggers, motor graders, backhoes.

Therefore, considering all the above, it is important to clarify that the objective of the present description is solely to present and define in an exemplary manner possible embodiments of the novel steering wheel support for a farming or civil engineering vehicle, according to the present invention. This is why, as persons skilled in the art will understand, various modifications and constructive combinations of equivalent elements are possible without straying from the scope of protection now defined by the accompanying claims.

The invention claimed is:

1. A support for a steering wheel of a vehicle, comprising:
an installation base;
a connector element;
a first articulated element having a first end pivotally connected to the installation base and a second end connected to the connector element;
a locking mechanism next to the installation base, the locking mechanism formed by a branch endowed with a locking pin, wherein the branch and the locking pin are disposed on a lower portion of the first articulated element for respective encasement in a receiver member disposed on the installation base; and
a second articulated element having a first end pivotally connected to the connector element and a second end configured to couple with a framework for installing a steering box having the steering wheel.

2. A vehicle comprising:
a chassis mounted on wheels with tires or on sets of belts;
a cabin for operation and control;
a front or rear portion which houses an engine under a hood to provide traction for movement of the vehicle;
an installation base;
a connector element;
a first articulated element having a first end pivotally connected to the installation base and a second end connected to the connector element;
a second articulated element having a first end pivotally connected to the connector element and a second end;
a framework connected to the second end of the second articulated element; and
a steering box including a steering wheel operably coupled with the framework,
wherein a slant of the steering box and the steering wheel are jointly adjustable, and the slant is an angle that varies between −10° and +10°.

3. The vehicle according to claim 2, wherein the vehicle is a tractor, a harvester, a picker, an excavator, a motor grader, a backhoe, or a farming or civil engineering machine.

4. The vehicle according to claim 2, further comprising a seat within the cabin, wherein the installation base is positioned at least partially vehicle rearward of a seat bottom on the seat.

5. A support for a steering wheel of a vehicle, comprising:
an installation base;
a connector element;
a first articulated element, the first articulated element having a first end and a second end;
a second articulated element having a first end and a second end;
a steering box operably coupled with the second articulated element, the steering box including a hydraulic system positioned through the first and second articulated elements or an electrical system positioned through the first and second articulated elements,
wherein the first end of the first articulated element is pivotally connected to the installation base,
wherein the first end of the second articulated element is connected to the second end of the first articulated element by the connector element,
wherein the second end of the second articulated element is configured to support the steering wheel, and
wherein the second end of the first articulated element and the first end of the second articulated element are aligned along a common axis as the second articulated element is rotated about the common axis.

6. The support according to claim 5, wherein the connector element is a glove, a pivot, or an articulating device providing for rotational movement of the second articulated element relative to the first articulated element.

7. The support according to claim 5, wherein the connector element comprises embedded locks for blocking rotational movement of the second articulated element relative to the first articulated element.

8. The support according to claim 5, wherein the first articulated element is pivotally connected to the installation base through a pivoting element.

9. The support according to claim 5, further comprising a framework, wherein a slant of the steering box and the steering wheel are jointly adjustable, and the slant is an angle which varies between −10° and +10°.

10. The support according to claim 5, wherein the first articulated element comprises a locking mechanism next to the installation base, and the locking mechanism is formed by a branch endowed with a locking pin, wherein the branch and the locking pin are disposed on a lower portion of the first articulated element for respective encasement in a receiver member disposed on the installation base.

11. The support according to claim 5, wherein the installation base comprises a height adjustment mechanism.

12. The support according to claim 5, wherein the installation base is anchored on a structure of a seat of the vehicle.

\* \* \* \* \*